United States Patent [19]

Boulanger

[11] 4,446,451

[45] May 1, 1984

[54] THERMOSTAT DEVICE HAVING IMPROVED MOUNTING MEANS

[75] Inventor: Henry J. Boulanger, Nicholasville, Ky.

[73] Assignee: Texas Instruments Incorporated, Dallas, Tex.

[21] Appl. No.: 449,943

[22] Filed: Dec. 15, 1982

[51] Int. Cl.³ .............................................. N01H 37/04
[52] U.S. Cl. .................................... 337/380; 337/372; 337/381
[58] Field of Search ................ 337/343, 365, 372, 380, 337/381

[56] References Cited

U.S. PATENT DOCUMENTS

| | | |
|---|---|---|
| 3,414,225 | 12/1968 | Lester . |
| 3,581,263 | 5/1971 | Moro ................................ 337/380 |
| 3,735,310 | 5/1973 | Kochanski ........................ 337/380 |
| 4,268,812 | 5/1981 | Satterlee ........................ 337/372 X |
| 4,297,668 | 10/1981 | Place ................................ 337/380 X |
| 4,349,806 | 9/1982 | Boulanger . |

*Primary Examiner*—George Harris
*Attorney, Agent, or Firm*—James P. McAndrews; John A. Haug; Melvin Sharp

[57] ABSTRACT

A thermostat device comprises a thermostat unit having a surface which faces in a first direction and which is preferably disposed in thermally-coupled heat-transfer relation to an object whose temperature is to be monitored so that the thermostat unit is promptly responsive to changes in object temperature, the thermostat unit also having other surfaces which face in an opposite direction. A metal bracket mounting means comprises a plate having an integral base portion extending in a plane to be secured to an object to be monitored, having an opening in the base portion of the plate, and having a pair of integral spring portions of the plate upstanding from said plane at respective opposite sides of the opening, the spring portions having distal ends thereof folded toward each other and back toward said plane to engage the second surface portions of the thermostat unit for detachably attaching the bracket means to the thermostat unit and for resiliently biasing the unit toward the object to be monitored so that said first surface of the unit extends through the base opening into thermally-coupled heat-transfer relation to the object.

5 Claims, 5 Drawing Figures

THERMOSTAT DEVICE HAVING IMPROVED MOUNTING MEANS

BACKGROUND OF THE INVENTION

The field of this invention is that of thermostat devices and the invention relates more particularly to thermostat devices adapted for widespread application to monitor the temperature of various different objects and equipments.

When thermostat devices are manufactured by automated manufacturing techniques or the like to achieve low unit costs so that the units are adapted for widespread application to monitor the temperatures of different types of objects and equipments, it is sometimes found that difficulties are encountered in testing the devices after manufacture, in shipping the devices to customers, and in mounting the devices on various objects or equipments whose temperatures are to be monitored. That is, the handling of the devices for test purposes is found to be cumbersome and the devices are somewhat bulky to package and ship in quantity so that tests and shipping costs tend to represent an excessive proportion of the otherwise low thermostat unit costs. Most important, customer mounting of the devices on objects to be monitored is also somewhat inconvenient and is frequently found to be less than fully satisfactory so that thermal response characteristics of the devices are slower than desired and frequently vary from device to device more than is believed necessary.

SUMMARY OF THE INVENTION

It is an object of this invention to provide a novel and improved thermostat device; to provide such a device having improved mounting means; to provide such a device which is adapted to be tested, shipped and mounted on an object whose temperature is to be monitored with improved economy and convenience; to provide such a device which is readily mounted on the object to be monitored to achieve fast and consistent thermal response characteristics; and to provide such a device which is of simple, rugged and inexpensive construction.

Briefly described, the novel and improved thermostat device of this invention includes a thermostat unit having a first surface which faces in a first direction and which comprises the preferred surface of the unit to be disposed in thermally-coupled heat-transfer relation to an object whose temperature is to be monitored, the thermostat unit also having second surface portions which face in an opposite direction. A metal mounting bracket means for the thermostat unit then comprises a plate having an integral base portion which extends in a plane and is adapted to be secured to the object to be monitored. The plate has an opening in the base portion and has integral spring portions of the plate upstanding from the plane of the base portion of the plate at respective opposite sides of the base plate opening. The spring portions of the plate have the distal ends thereof folded toward each other and back toward the plane of the base portion of the plate to engage the second surface of the portions of the thermostat unit for detachably attaching the plate to the thermostat unit and biasing the unit to extend through the base plate opening into thermally-coupled heat-transfer relation to the object to be monitored. In one preferred embodiment where terminal means extend from the thermostat unit, the noted first surface of the thermostat unit is located at one end of the unit and said second surface portions of the thermostat unit extend around the unit circumference, the distal ends of the spring portion of the mounting bracket resiliently engaging said second surface portions and permitting rotation of the unit while mounted on said object to dispose the unit terminal means in a selected orientation relative to the object. In an alternate preferred embodiment, flats are provided on opposite sides of the circumference of the unit and the distal ends of said plate springs engage said flats to prevent rotation of the thermostat unit while mounted on the object to retain a selected terminal orientation relative to the object. In a preferred embodiment, the thermostat unit includes a housing having an integral flange and having thermally-responsive means mounted in that unit so that, when the spring portions of the mounting bracket are arranged to fit over that integral flange for mounting the unit, the unit is mounted without altering the thermal response characteristics of the unit.

In that arrangement, the mounting brackets are of low cost construction, the thermostat units are adapted to be tested and shipped separate from the bracket mounting plates for achieving greater convenience in testing using a standard mounting bracket or in other conventional manner and for achieving easier and lower cost packaging and shipping of the device components, and the thermostat devices are more easily and reliably mounted on objects to be monitored for achieving more consistent thermal response characteristics.

DESCRIPTION OF THE DRAWINGS

Other objects, advantages and details of the novel and improved thermostat device of this invention appear in the following detailed description of preferred embodiments of the invention, the detailed description referring to the drawings in which:

FIG. 4 is a section view along line 4—4 of FIG. 2; and

FIG. 5 is a section view along line 5—5 of FIG. 2.

DESCRIPTION OF PREFERRED EMBODIMENTS

Figure 1:
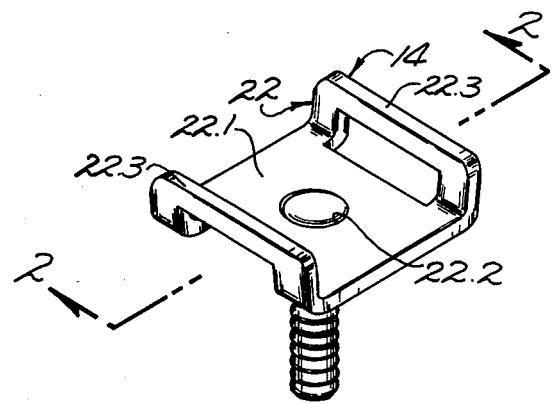
FIG. 1 is a plan view of a preferred embodiment of the thermostat device of this invention.
Figure 2:
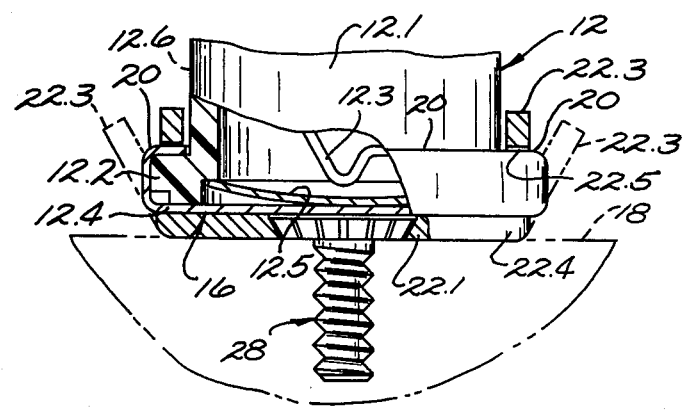
FIG. 2 is a section view along line 2—2 of FIG. 1.

Referring to the drawings, 10 in FIGS. 1 and 2 indicates a preferred embodiment of the novel and improved thermostat device of this invention which is shown to include a thermostat unit 12 and mounting bracket means 14.

In accordance with this invention, the thermostat unit 12 has a first surface 16 which faces in a first direction and which is preferably disposed in thermally-coupled heat-transfer relation to an object 18 whose temperature is to be monitored. The thermostat unit also has second surface portions 20 which face in an opposite direction. The thermostat unit 12 is of a conventional construction as shown in U.S. Pat. No. 4,349,806, the disclosure of which is herein incorporated by this reference. In that known device, the thermostat unit comprises a generally cylindrical, cup-shaped housing 12.1 having an open end and having an integral flange 12.1 formed around the rim of the open-end of the cup-shaped housing enclosing electrical switch means diagrammatically indicated at 12.3. A metal cap 12.4 is secured over the open end of the cup-shaped housing 12.1 by swaging, rolling or staking over the flange 12.2 for forming said first surface 16 at one end of the unit and forming the second surface portions 20 extending around the circumference of the unit. A thermally-responsive bimetallic snap-acting dished disc member 12.5 (illustrated as a single layer for clarity) is disposed within that housing adjacent to the metal cap 12.4 to be responsive to snap to an inverted dished configuration to selected changes in temperature for moving the switch means in the unit between open and closed circuit switch positions and the like in conventional manner and, accordingly, the first surface 16 of the device is preferably disposed in thermally-coupled heat-transfer relation to the object 18 whose temperature is to be monitored so that the thermostat unit is most promptly and reliably responsive to changes in object temperature. Preferably flats 12.6 are formed on opposite sides of the housing 12.1 and preferably terminal means 12.7 extend from the thermostat unit for connecting the noted electrical switch means in an electrical circuit as will be understood. As a thermostat unit preferred for use in this invention has been fully described in the noted patent, it is not further described herein and it will be understood that any conventional thermostat units having characteristics as noted above are adapted to be used within the scope of this invention.

In accordance with this invention, the mounting bracket means 14 comprises a metal plate having an integral base portion 14.1 which extends in a plane and which has mounting holes 14.2 formed therein so that screw means 22 fit through the holes for securing the plate 14 to the object 18 whose temperature is to be monitored. Preferably the plate 14 is formed of a low carbon steel or a stainless steel or the like having a stiff resilience but the plate is also formed of other materials such as phosphor bronze or the like within the scope of this invention. The base portion of the plate has an opening 14.3 formed therein as shown.

In accordance with this invention, the base plate 14 further incorporates a pair of integral spring portions 14.4 which stand up from the plane of the base portion of the plate at opposite sides of the opening 14.3 in the plate. The distal ends 14.5 of the spring portions are preferably folded toward each other and back toward the plane of the base portion of the plate as shown particularly in FIG. 2 so that the distal ends of the spring resiliently engage the second surface portion 20 of the thermostat unit. In that arrangement, the spring portions detachably attach the base plate to the thermostat unit and resiliently bias the thermostat unit toward the object 18 so that the first surface 16 of the thermostat unit extends through the base plate opening 14.3 into thermally-coupled heat-transfer relation to the object 18. Preferably as shown in FIG. 2, the spring portions 14.5 fit over the unit housing flange 12.2 for holding the unit securely against the object 18 without tending to stress the cap 12.4 or the snapacting disc 12.5 in a way which might change the thermal response characteristics of the unit 12 during mounting of the unit. Preferably as shown, the distal ends 14.5 of the base plate springs have a generally arcuate shape as indicated at 14.6 and also bear resiliently against circumferential portions of the thermostat unit housing. The unit 12 is therefor held in the orientation relative to the object 18 as illustrated in FIGS. 1 and 2 but is adapted to be rotated if desired for disposing the terminal means 12.7 of the unit in any desired orientation relative to the object 18.

Figure 3:
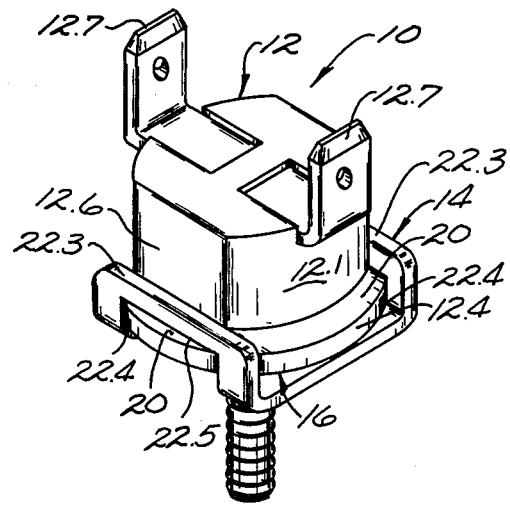
FIG. 3 is a plan view of an alternate preferred embodiment of the thermostat device of this invention.

In another alternate embodiment of this invention as indicated at 24 in FIGS. 3 and 4 (wherein corresponding components are identified by corresponding numerals), the bracket means 26 comprises a metal plate having a base portion 26.1 extending in a plane, having mounting holes 26.2 for receiving mounting screws 22, having an opening 26.3 in the base portion of the plate, having a pair of integral spring portions 26.4 upstanding from the plate at opposite sides of the opening, and having the distal ends 26.5 of the springs folded toward each other and toward the base portion of the plate. In this embodiment of the invention, the plate also has integral side flanges 26.6 formed therein and has a bend 26.7 initially formed in the plate (as is diagrammatically indicated in FIG. 5) such that, when the plate is drawn down against the object 18 by screws 22, the plate bends at bend location 26.7 to lie flat against the object and the flanges 26.6 extend up at either side of the thermostat unit 12 for more positively retaining the unit on the object 18. In one preferred embodiment of the invention, the distal ends 26.5 of the plate springs engage the flats 12.3 on the thermostat unit for preventing rotation of the unit to retain the unit terminals in a selected orientation relative to the object 18.

In that way, the bracket means 14 is of simple, low cost construction; the thermostat units are adapted to be easily tested and shipped separate from the bracket mounting plates for achieving convenience in testing and easier and less bulky packaging for shipping; and the thermostat devices are more easily and reliably mounted on objects to be monitored to achieve consistent thermal response characteristics.

It should be understood that although particular embodiments of this invention have been described above by way of illustrating the invention, this invention includes all modifications and equivalents thereof falling within the scope of the appended claims.

I claim:

1. A thermostat device comprising a thermostat unit and bracket means for mounting the unit on an object whose temperature is to be monitored, characterized in that the thermostat unit has a first surface preferred to be disposed in thermally-coupled heat-transfer relation to said object and has second surface portions facing in an opposite direction, and in that said bracket means comprises a plate having an integral base portion extending in a plane to be secured to said object for mounting the plate on the object, having an opening in the base portion of the plate, and having a pair of integral spring portions of the plate upstanding from said plane at respective opposite sides of said opening, said spring portions having distal ends thereof folded to extend toward each other and back toward said plane to engage said second surface portions of the thermostat unit for detachably attaching the bracket means to the thermostat unit and for biasing said thermostat unit towards said object so that said first surface thereof extends through said base plate opening into thermally-coupled heat-transfer relation to the object, thereby to maintain desired thermal coupling of said first unit surface to the object during thermal expansion and contraction thereof.

2. A thermostat device as set forth in claim 1 further characterized in that the thermostat unit comprises a cup-shaped housing having an open end and having an integral flange around said open end, switch means disposed in the housing to be movable between circuit positions, thermally responsive means disposed in the open housing end for moving the switch means between said circuit positions in response to selected changes in temperature, and a metal cap which extends over the open housing end to form said first surface of the thermostat unit and which is formed over said flange to provide said second unit surface, and in that said spring portions of the bracket plate fit over said integral housing flange for mounting the unit on the object where temperature is to be monitored without altering the thermal response characteristics of the unit during such mounting.

3. A thermostat device as set forth in claim 2 further characterized in that the bracket plate has additional integral portions thereof upstanding from said plane for deterring detachment of the thermostat unit from the bracket after mounting on said object.

4. A thermostat device as set forth in claim 3 further characterized in that the thermostat unit has terminal means extending therefrom and has a generally cylindrical configuration having said first surface disposed at one end of the unit and having said second surface portion extending around the cylindrical circumference of the unit, said distal ends of said spring portions having an arcuate shape resiliently engaging said second surface positions around the cylindrical unit for permitting selected rotation of the thermostat unit while mounted on said object to dispose said terminal means in a selected orientation relative to the object.

5. A thermostat device as set forth in claim 3 further characterized in that the thermostat unit has terminal means extending therefrom and has a selected configuration having said first surface disposed at one end of the unit and having said second surface portions spaced at opposite sides of the unit, said spring portions being arranged at said respective opposite sides with said distal ends thereof resiliently engaging respective second surface portions to prevent rotation of the thermostat unit while mounted on said object to retain said terminal means in a selected orientation relative to the object.

* * * * *